United States Patent
Beere

(10) Patent No.: US 10,475,121 B1
(45) Date of Patent: Nov. 12, 2019

(54) IDENTIFICATION OF LOSS RISK CANDIDATES FOR FINANCIAL INSTITUTIONS

(71) Applicant: Wells Fargo Bank, N.A., Charlotte, NC (US)

(72) Inventor: Mark Beere, Mill Valley, CA (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 834 days.

(21) Appl. No.: 14/877,518

(22) Filed: Oct. 7, 2015

(51) Int. Cl.
 *G06Q 40/04* (2012.01)

(52) U.S. Cl.
 CPC .................. *G06Q 40/04* (2013.01)

(58) Field of Classification Search
 CPC ........ G06Q 40/06; G06Q 40/08; G06Q 40/00; G06Q 40/04
 See application file for complete search history.

(56) References Cited

U.S. PATENT DOCUMENTS

| | | | |
|---|---|---|---|
| 7,743,067 B2 * | 6/2010 | Ducheneaut | G06Q 30/02 707/769 |
| 7,958,050 B2 | 6/2011 | Finch | |
| 8,036,928 B2 | 10/2011 | Fawls et al. | |
| 8,700,614 B1 * | 4/2014 | Diller | G06F 16/24578 707/723 |
| 2005/0027645 A1 | 2/2005 | Lui et al. | |
| 2005/0222929 A1 * | 10/2005 | Steier | G06Q 40/00 705/35 |
| 2007/0239577 A1 | 10/2007 | Grody et al. | |
| 2008/0021801 A1 * | 1/2008 | Song | G06Q 40/00 705/35 |
| 2009/0125369 A1 * | 5/2009 | Kloostra | G06Q 10/00 705/35 |
| 2011/0170799 A1 * | 7/2011 | Carrino | G06T 17/05 382/285 |
| 2013/0024373 A1 * | 1/2013 | Choudhuri | G06Q 30/018 705/42 |
| 2013/0036038 A1 * | 2/2013 | Nisal | G06Q 40/08 705/35 |
| 2014/0052494 A1 * | 2/2014 | Anne | G06Q 10/063 705/7.28 |

(Continued)

FOREIGN PATENT DOCUMENTS

WO  WO-2014130308 A1 * 8/2014 ............. G06F 16/93

OTHER PUBLICATIONS

O'Riordan et al.: Information Filtering and Retrieval: An Overview, Aug. 27, 2003, pp. 1-8. (Year: 2003).*

(Continued)

*Primary Examiner* — Bijendra K Shrestha
(74) *Attorney, Agent, or Firm* — Walter Haverfield LLP; James J. Pingor

(57) ABSTRACT

Systems and methods of analyzing client activity and identifying loss risk candidates based on the client activities is provided. A client database can be analyzed for determination of clients having a high risk of losses for a financial institution. The determination is based on known activities of filtered clients where the activities are historically indicative of resulting in a loss for the financial institution. A target client profile representative of a high risk client may be selected. The client database can be mapped to find similar clients to be identified as a high risk of loss.

17 Claims, 8 Drawing Sheets

(56) References Cited

U.S. PATENT DOCUMENTS

| | | | |
|---|---|---|---|
| 2014/0200953 A1 | 7/2014 | Mun | |
| 2014/0279641 A1* | 9/2014 | Singh | G06Q 50/265 |
| | | | 705/325 |
| 2015/0235266 A1* | 8/2015 | Jain | H04W 4/021 |
| | | | 705/14.58 |
| 2015/0332012 A1* | 11/2015 | Edelson | G16H 50/30 |
| | | | 705/2 |
| 2016/0048985 A1* | 2/2016 | Jones | G06T 11/206 |
| | | | 345/593 |
| 2016/0361026 A1* | 12/2016 | Sarkar | A61B 5/02405 |

OTHER PUBLICATIONS

Davenport et al.: Customer Service: Know what Your Customers Wants Before They Do, Dec. 2011, pp. 1-14. (Year: 2011).*

* cited by examiner

IDENTIFICATION OF LOSS RISK CANDIDATES FOR FINANCIAL INSTITUTIONS

BACKGROUND

Financial institutions provide services to a large variety of clients. For instance, each client can have a unique and detailed deposit or financial transaction history. Although it can be helpful in streamlining and targeting services, financial institutions oftentimes find it difficult to identify similarities between clients. Further, the institutions often find it difficult to predict which clients may default on their accounts until default actually occurs.

BRIEF DESCRIPTION

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises systems and methods of determining loss risk clients of a financial institution. In aspects of the innovation, a tool is contemplated where client activities may be evaluated and given weights such that a prediction or a metric of the likelihood the client is a loss risk can be determined. It is further contemplated that the tool may then identify a single client account or a subset of client accounts to use as a target. The target can be used to find similar clients in a larger pool of client accounts that may be profiled as a loss risk.

In one aspect of the innovation, a method for determining loss risks begins by receiving client data including client activity data associated with a plurality of client accounts. Next the innovation can filter the client activity data into a subset of the client activity data and subsequently generate a composite activity ranking from calculated composite activity scores of clients according to the filtered subset of the client activity data.

In another example embodiment of the innovation, a system for determining loss risks, can include a processor, a client database having account information for clients stored therein, and a client activity database having account activity information for entries in the client database. The system can further include a filtering component that filters the client activity data into a subset of client activity data and a ranking component that generates a composite activity ranking of clients according to the filtered subset of the client activity data.

In yet another example embodiment, a computer readable medium having instructions to control one or more processors is provided. The processors are configured to receive client data including client activity data associated with a plurality of client accounts and to filter the client activity data into a subset of the client activity data. The processors receive weights for at least one data field, apply the weights to the subset of client activity data, and generate a composite activity ranking from calculated composite activity scores of clients according to the filtered subset of the client activity data. The processors can further be configured to receive an identification of a target high risk client and to identify client accounts that are similar to the identified high risk client based at least in part on the composite activity rank.

In aspects, the subject innovation provides substantial benefits in terms of identifying loss risk clients. For instance, the innovation can identify a loss risk client using collected objective data. Other aspects can identify similar clients that were not previously known to be loss risks. These and other benefits of the innovation will be better understood upon a review of the detailed description infra.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
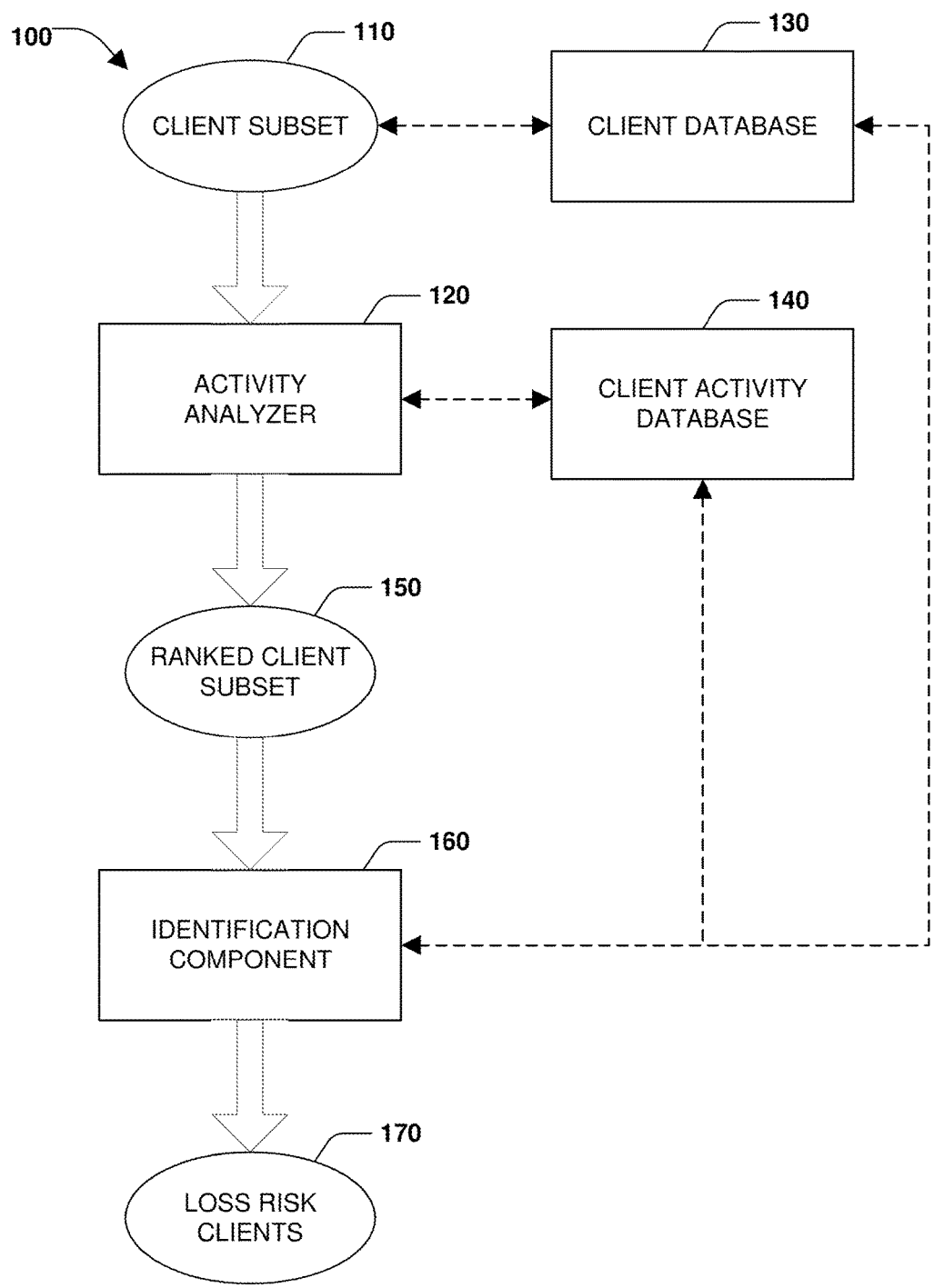
FIG. 1 illustrates an example input/output diagram for identifying loss risk clients.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers or special-purpose machines.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

With reference to FIG. 1, an example input/output diagram 100 for identifying loss risk clients is depicted. A client subset 110 is received by an activity analyzer 120 to rank clients of a financial institution. The client subset 110 accesses a client database 130. The client database 130 includes client account information for clients of the financial institution. The client subset 110 is a subset of the client database 130. In one embodiment, the client subset 110 includes clients for a geographical region. In another embodiment, the client subset 110 includes clients that are associated with a regional branch of the financial institution. In yet another embodiment, the client subset 110 includes clients that have business deposit accounts. The client subset 110 may be generated using segmentation flags. Segementation flags may include the presence of zero balance accounts, XFlag, and/or public funds accounts or the like. Below is an example listing of client information and/or segmentation flags as data fields in the client database. The client information may be a plurality of data fields in the client database associated with a client. While a specific example is illustrated below, it is to be understood that this example is provided merely to provide context to the innovation and not to limit scope in any manner.

NAME_MIN Different accounts held by a customer. Choosing the alphanumeric min (along with max) allows to see two of multiple names.
NAME_MAX Different accounts held by a customer. Choosing the alphanumeric max (along with min) allows to see two of multiple names.
INDUSTRY_BIN Higher-level industry description; it is an amalgam from consolidating the higher levels available in both standard industrial classification (SIC) and North American industry classification systems.
INDUSTRY_DESCRIPTION Detailed description of client industry.
SEG_MAX What is the highest account-level segment seen in the customer relationship. O means other (e.g. wholesale, and which would be "highest risk"), B means Business Banking while S means Store.
SEG_MIN What is the lowest account-level segment seen in the customer relationship. S means Store (which would be "lowest risk"), B means Business Banking, while O means other (e.g. Wholesale).
HYBRID_LOB 1 if existence of accounts in both Wholesale and Regional Bank, 0 if otherwise.
HYBRID_SEG 1 if existence of accounts in both Business Banking and Store Segments, 0 if otherwise.
STORE_SEG_PRESENCE 1 if at least 1 account is in Store segment, 0 if otherwise.
BANKER_SEG_PRESENCE 1 if at least 1 account is in Business Banking segment, 0 if otherwise.
OTHER_SEG_PRESENCE 1 if at least 1 account is in the other lines of business (e.g. Wholesale), 0 if otherwise.
PUB_FUND_PRESENCE 1 if at least 1 account is in a Public Funds subproduct, 0 if otherwise.
ZBA_PRESENCE 1 if at least 1 account is a zero balance account (ZBA) (master or secondary), 0 if otherwise.
XFLAG_PRESENCE 1 if at least 1 account has an X flag of X1 or X2, 0 if otherwise.
DDRETFLAG 1 if at least 1 account has Desktop Deposit via RETOnline, 0 if otherwise.
DDCOMMLFLAG 1 if at least 1 account has Desktop Deposit viaCommercial Online, 0 if otherwise.

In one embodiment, the client subset 110 can filter client account data according to predetermined (or user identified) thresholds or input thresholds in associated data fields. The predetermined thresholds for data fields can be predetermined such that a specific set of clients can be ranked or ordered. For example, the client subset 110 can include every client that has 1 or more of the following thresholds: Accounts: 5+, Deposited Cash: $10,000+, Deposited Items: 25+, Automated Clearing House (ACH) Credits Amount: $25,000+, ACH Credits Count: 25+, ACH Debts Amount: $25,000+, ACH Debits Count: 25+, Wire Credits Amount: $25,000+, Wire Credits Count: 25+, Wire Debts Amount: $25,000+, Wire Debits Count: 25+, Checks Written Amount: $25,000+, Checks Written Count: 25+.

The activity analyzer 120 receives the client subset 110 for processing. The activity analyzer 120 accesses a client activity database 140. The client activity database 140 includes activity data for clients in the client database 130. The activity data includes data fields for information, actions, and/or occurrences relating to clients. The activity data can include balances, checks written, check deposits, checks returned deposited, cash deposits, automated clearing house (ACH) debits, ACH credits, ACH credit returns, wire transfer debits, wire transfer credits, return rations (in money or units, for paper items and ACH), spending velocity, or the like.

The activity analyzer 120 generates a composite activity rank for each client in the client subset 110. In one embodiment, the activity analyzer 120 can generate nominal rankings for each data field in the activity data. The activity analyzer can generate rank fields that can be associated with each data field. Below is an example listing of potential activity data fields and/or rank fields along with descriptions of each field.

ACCTS Number of accounts of the customer
ACCTS_RANK Associated ranking
COL_BALS Collected balances on all accounts for the customer
COL_BALS_RANK Associated ranking
CASH_DEP_AMT Deposited cash for all accounts for the customer
CASH_DEP_AMT_RANK Associated ranking
ITEMS_DEP_AMT Items deposited $ amounts for all accounts for the customer
ITEMS_DEP_AMT_RANK Associated ranking
ITEMS_DEP_CNT Items deposited count
ITEMS_DEP_CNT_RANK Associated ranking
RETURN_DEP_ITEMS_AMT Return deposited items amount
RETURN_DEP_ITEMS_AMT_RANK Associated ranking
RETURN_DEP_ITEMS_CNT Return deposited items count RETURN_DEP_ITEMS_CNT_RANK Associated ranking RETURN_DEPITEMS_AMT_RATIO Ratio of returned deposited items $ amounts to deposited items $ amounts. More returns relative to underlying volume may be indicative of problematic transaction behavior.

RETURN_DEPITEMS_AMT_RATIO_RANK Associated ranking

RETURN_DEPITEMS_CNT_RATIO Ratio of returned deposited item counts to deposited items counts. More returns relative to underlying volume may be indicative of problematic transaction behavior.

RETURN_DEPITEMS_CNT_RATIO_RANK Associated ranking

ACH_RETURN_DEBITS_AMT ACH return debit dollar amounts—ACH credits that have been reversed due to errors of some kind in the ACH network.

ACH_RETURN_DEBITS_AMT_RANK Associated ranking

ACH_RETURN_DEBITS_CNT ACH return debit counts—ACH credits that have been reversed due to errors of some kind in the ACH network.

ACH_RETURN_DEBITS_CNT_RANK Associated ranking

ACH_CREDITS_AMT ACH credit dollar amounts

ACH_CREDITS_AMT_RANK Associated ranking

ACH_CREDITS_CNT ACH credit transaction counts

ACH_CREDITS_CNT_RANK Associated ranking

ACH_RETURN_DEB_AMT_RATIO Ratio of ACH Returns in dollars to ACH credits in dollars. More returns relative to underlying volume may be indicative of problematic transaction behavior.

ACH_RETURN_DEB_AMT_RATIO_RANK Associated ranking

ACH_RETURN_DEB_CNT_RATIO Ratio of ACH Return transaction count to ACH credit transaction count. More returns relative to underlying volume may be indicative of problematic transaction behavior.

ACH_RETURN_DEB_CNT_RATIO_RANK Associated ranking

ACH_DEBITS_AMT Dollar amount of ACH debits.

ACH_DEBITS_AMT_RANK Associated ranking

ACH_DEBITS_CNT Transaction count of standard ACH debits.

ACH_DEBITS_CNT_RANK Associated ranking

ACH_OTHDEBITS_AMT Other ACH debits transaction dollar amount.

ACH_OTHDEBITS_AMT_RANK Associated ranking

ACH_OTHDEBITS_CNT Other ACH debits transaction counts.

ACH_OTHDEBITS_CNT_RANK Associated ranking

WIRE_CREDITS_AMT Dollar amount of Wire credits.

WIRE_CREDITS_AMT_RANK Associated ranking

WIRE_CREDITS_CNT Transaction count of wire credits.

WIRE_CREDITS_CNT_RANK Associated ranking

WIRE_DEBITS_AMT Dollar amount of Wire debits.

WIRE_DEBITS_AMT_RANK Associated ranking

WIRE_DEBITS_CNT Transaction count of wire credits.

WIRE_DEBITS_CNT_RANK Associated ranking

CHECKS_WRITTEN_AMT Dollar amount of checks cleared.

CHECKS_WRITTEN_AMT_RANK Associated ranking

CHECKS_WRITTEN_CNT Transaction count of checks cleared.

CHECKS_WRITTEN_CNT_RANK Associated ranking

OTC_DEP_AMT Dollar amount of over-the-counter deposits.

OTC_DEP_AMT_RANK Associated ranking

OTC_DEP_CNT Transaction count of over-the-counter deposits.

OTC_DEP_CNT_RANK Associated ranking

DESKTOP_DEPOSIT_AMT Dollar amount of Desktop Deposit deposits.

DESKTOP_DEPOSIT_AMT_RANK Associated ranking

DESKTOP_DEPOSIT_CNT Transaction count of Desktop Deposit deposits.

DESKTOP_DEPOSIT_CNT_RANK Associated ranking

VELOCITY_PROXIED A sum of several key debit metrics (ACH, wires, and checks) divided by collected balances. Indicative of how fast money moves through the customer's accounts and should be used as a relative indicator.

VELOCITY_PROXIED_RANK Associated ranking

In one embodiment, percentile ranks can used to drive the conditional formatting of their related metrics. The activity analyzer 120 generates a ranked client subset 150. The ranked client subset 150 is based on the composite activity rank. In one embodiment, the composite activity rank can be generated based on an average rank of each data field. In another embodiment, the composite activity rank can be generated based on an average rank of specific selected data fields. Below is an example listing of composite activity ranking data fields along with descriptions of each field.

CUSTOM_COMPOSITE_RANK_PRNK Percent rank of the custom composite rank

CUSTOM_COMPOSITE_RANK Custom Composite Rank—the sum total of the individual activity metrics' ranks that have been chosen to comprise the custom composite rank.

COMPOSITE_RANK The sum of several activity metrics' ranks used as a starting point to identify accounts of interest.

COMPOSITE_RANK_RANK The rank of the Composite Rank—after adding up an accounts various activity ranks, how does the new Composite Rank compare to other clients.

CUSTOMER_ID CIS/ECN—the information presented here is 1 row per customer; individual account behaviors are aggregated up to the customer level.

TARGET_FLAG Generic flag to allow selection of accounts already known to be of interest, regardless of whether their Composite Rank puts client in the candidate pool for review.

Figure 2:
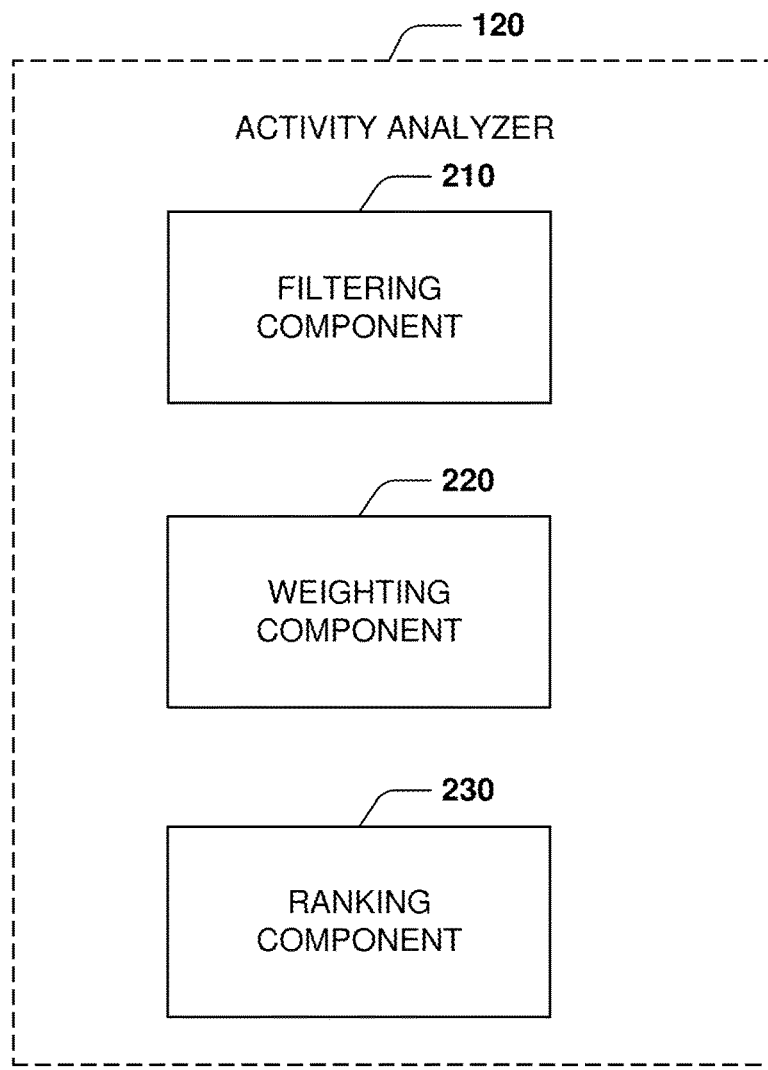
FIG. 2 illustrates an example component diagram of an activity analyzer.

With reference to FIG. 2, and continuing reference to FIG. 1, a component diagram of the activity analyzer 120 is depicted. The activity analyzer 120 includes a filtering component 210. The filtering component 210 selects data fields from which to base the composite activity rank. For example, the filtering component 210 can select accounts, checks written, over the counter (OTC) deposits, cash deposited, items deposited, ACH credits, ACH debits, wire credits, and wire debits as the data fields to compile a composite activity rank. The data fields are used for the composite activity rank.

The activity analyzer 120 includes a weighting component 220. The weighting component 220 can apply weights to the data fields. The weights can prioritize some data fields over others. For example, checks written may be seen as more indicative of a loss risk than items deposited. The weighting component 220 can apply more weight to checks written such that it affects the composite activity ranking more than items deposited.

The activity analyzer 120 includes a ranking component 230. The ranking component 230 calculates a composite activity rank for each client based on their activity rankings of individual data fields. The composite activity rank indicates a level of risk associated with a client. The composite activity rank can be a sum of the nominal ranks of each selected data field from the filtering component 210 such that the lowest number represents the highest composite activity ranked client. In one embodiment, the composite activity rank can be an average, mean, median, or the like of the individual rankings of each ranked data field or selected data field. The ranking component 230 generates a ranked client subset 150 output by the activity analyzer 120. The ranked client subset 150 includes an ordered composite ranking of each client in the client subset 110.

With reference again to FIG. 1, the identification component 160 identifies clients that are potential loss risks. The identification component 160 uses the ranked client subset 150 to identify clients that have high risk for losses according to the composite activity ranks. The identification component 160 searches the client database 130 and/or the client activity database 140 to identify clients similar to those of the ranked client subset 160. The identification component 160 generates a list of loss risk clients 170 from the analysis performed on the ranked client subset 150, the client database 130, and the client activity database 140.

Figure 3:
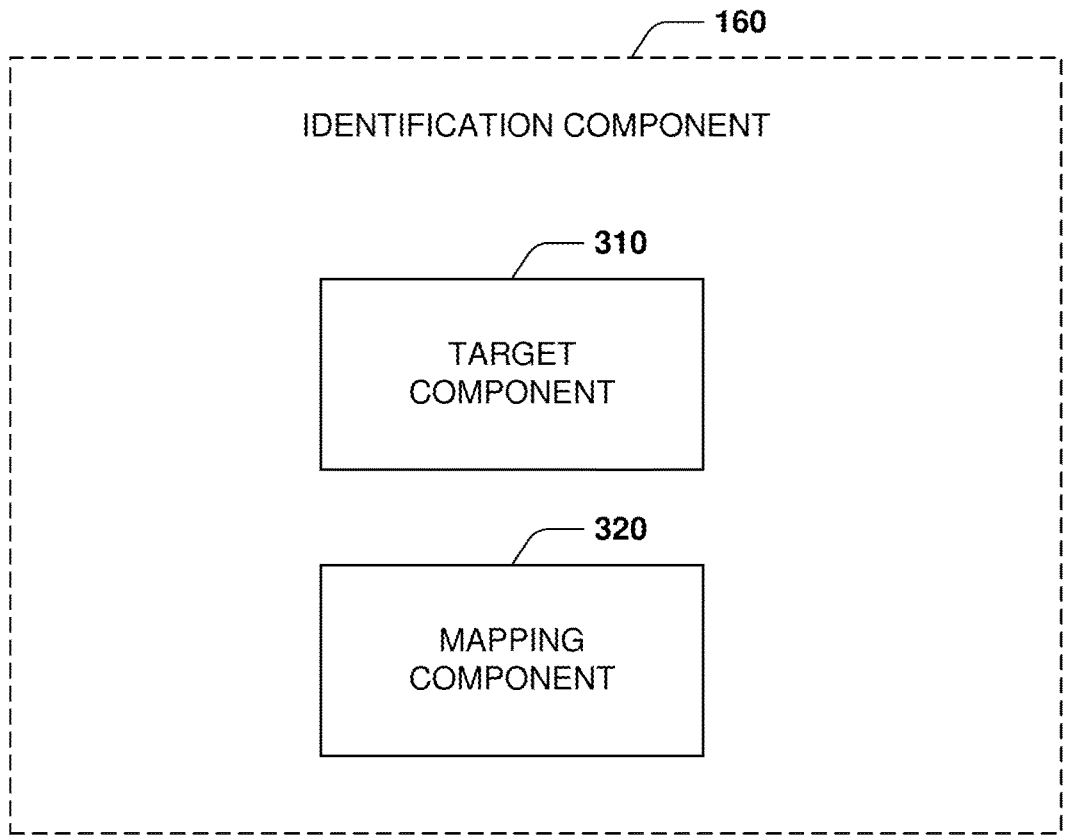
FIG. 3 illustrates an example component diagram of an identification component.

With reference to FIG. 3, and continuing reference to FIG. 1, the example identification component 160 includes a target component 310 and a mapping component 320. The target component 310 accesses the ranked client subset 150 to determine a target. The target can be an activity rank profile that includes data in activity data fields that are representative of a client that is a loss risk. In one embodiment, the target component 310 receives a selection of a client that is a loss risk to be used as the target. In another embodiment, the target component 310 averages each data field for the top ranked clients in the ranked client subset 150. The target component 310 then uses the averages as the activity rank profile. For example, the target component 310 averages the data in each data field for the top 5,000 ranked clients or top 5% in the ranked client subset 150.

The mapping component 320 receives the target from the target component 310. The mapping component 320 accesses the client database 130 and/or the client activity database 140. The mapping component 320 maps the client activity information to the target. The mapped client activity information indicates clients that are closest in similarity to the target.

Figure 4:
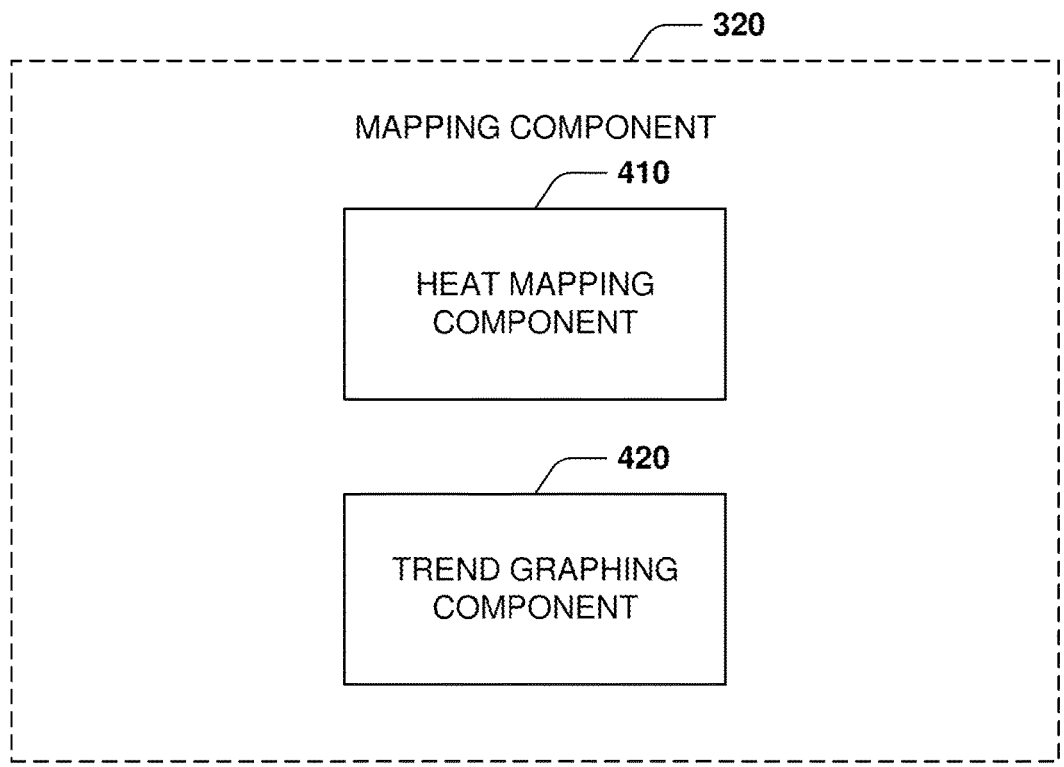
FIG. 4 illustrates an example component diagram of a mapping component.

With reference now to FIG. 4, and continuing reference to FIG. 3, the mapping component 320 utilizes mapping algorithms to map clients to the target. The mapping component 320 includes a heat mapping component 410. The heat mapping component 410 generates heat maps according to the target. The heat maps compile similar clients to the target into a visual representation. The heat maps can include color coding indicating similarity of each client account to the target. For example, a client that is similar to the target, the client can be colored red; and a client that is less similar to the target can be colored blue.

In examples, the heat mapping component 410 generates heat maps by receiving data points from the data fields. The heat mapping component 410 calculates a data distribution of the data points. The data distribution has bins, with each bin representing an interval. The heat mapping component 410 renders a heat map based on the data distribution. The heat map includes regions corresponding to the bins. The heat mapping component 410 defines thresholds for different values of the data point density. The heat mapping component 410 assigns each bin a threshold based on the data point density of the bin. The heat mapping component 410 assigns a region a color based on the assigned threshold of the bin corresponding to the region; and coloring the region with the assigned color in the heat map.

The mapping component 320 can include a trend graphing component 420. The trend graphing component 420 tracks composite activity rankings over time. The trend graphing component 420 can receive a ranking threshold with which to compare to client rankings in the ranked client subset 150. In one embodiment, the ranking threshold is the ranking of the target. In another embodiment, the ranking threshold can be an average ranking of selected ranked clients of the ranked client subset 150.

Figure 5:
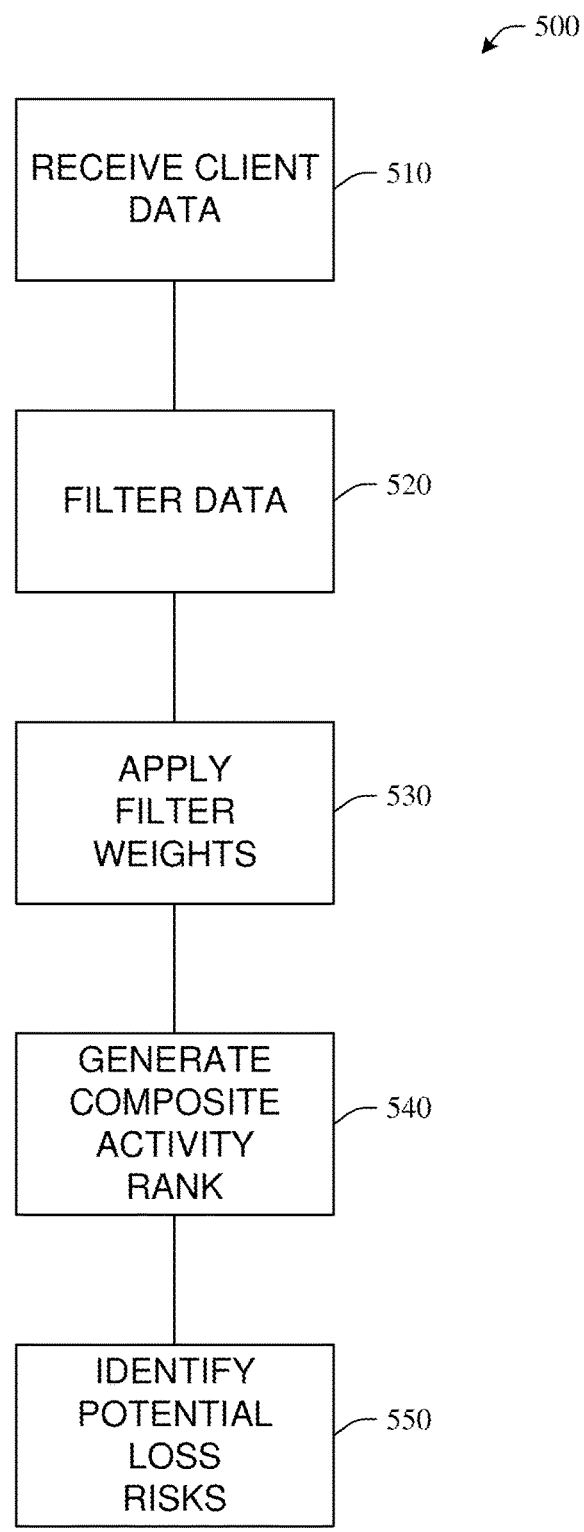
FIG. 5 illustrates a flowchart to identify loss risk clients.

With reference to FIG. 5, an example method 500 is depicted for authenticating a customer of a financial institution. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 500 is described in conjunction with a specific example is for explanation purposes.

In aspects, method 500 can begin at 510 by receiving client data. For example, a financial institution enters a list of a complete client database. The financial institution may initiate a request to identify potential loss risks within its current client database. It is appreciated that a device such as a computer, a mobile device and/or the like may receive the request and used by the customer or the financial institution.

At 520, the client data is filtered. The client data may be filtered according to coarse filtering, refined filtering, and/or a combination of the two. Continuing the example, the device can filter the data according to selected criteria to generate a reduced client subset with which to perform analysis or the like. For example, the complete client database can be coarsely filtered for client account data such as account size, region, and/or the like. The coarsely filtered client database can be refined filtered according to client activity data. The client activity data can be data that is historically indicative of loss risk clients. The act of filtering results in a reduced client subset.

At 530, filter weights are applied to the reduced client subset. Filter weights can be used to prioritize selected client activities that are more indicative of a loss risk. For example, deposit amounts may be prioritized over number of transactions such that deposit amounts affect the composite activity rank more than number of transactions. At 540, a composite activity rank is generated of the reduced client subset. The composite activity rank can be based on nominal rankings of individual data fields in the client activity data. Continuing the example, higher risk clients are ranked in descending order, e.g. the lower the rank, the higher the risk or other preferred rank/order.

Figure 6:
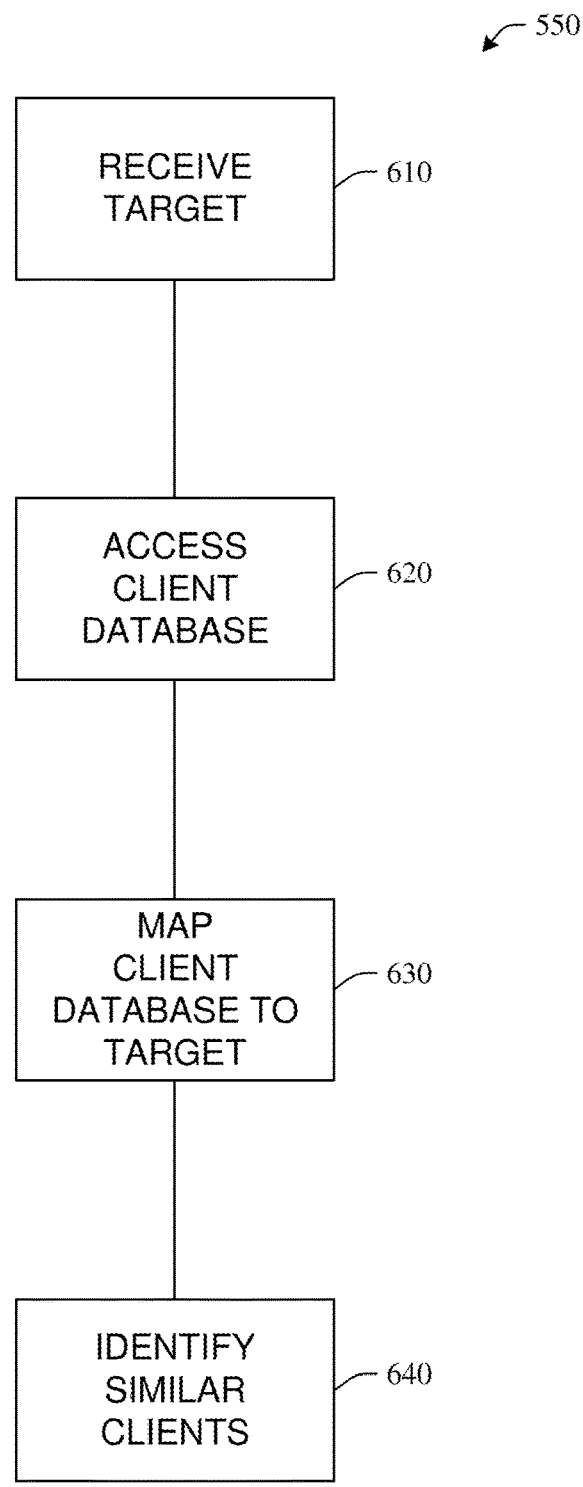
FIG. 6 illustrates a detailed flowchart to identify loss risk clients.

At 550, potential loss risks are identified based on the composite activity rank. With reference to FIG. 6, a detailed method for identifying potential loss risks (550) is depicted.

At 610, identifying loss risks 550 includes defining a target based on the composite activity ranking. The target is a client deemed as a loss risk based on the composite activity rankings. For example, a client with a high ranking is selected as the target. The activity data associated with the client is used. At 620, the complete client database and/or the client activity database is accessed. At 630, the clients in the complete client database are mapped to the target to find clients. At 640, mapped clients are identified as having similar composite activity data to the target. The clients similar to the target are identified as potential loss risks 550.

Figure 7:
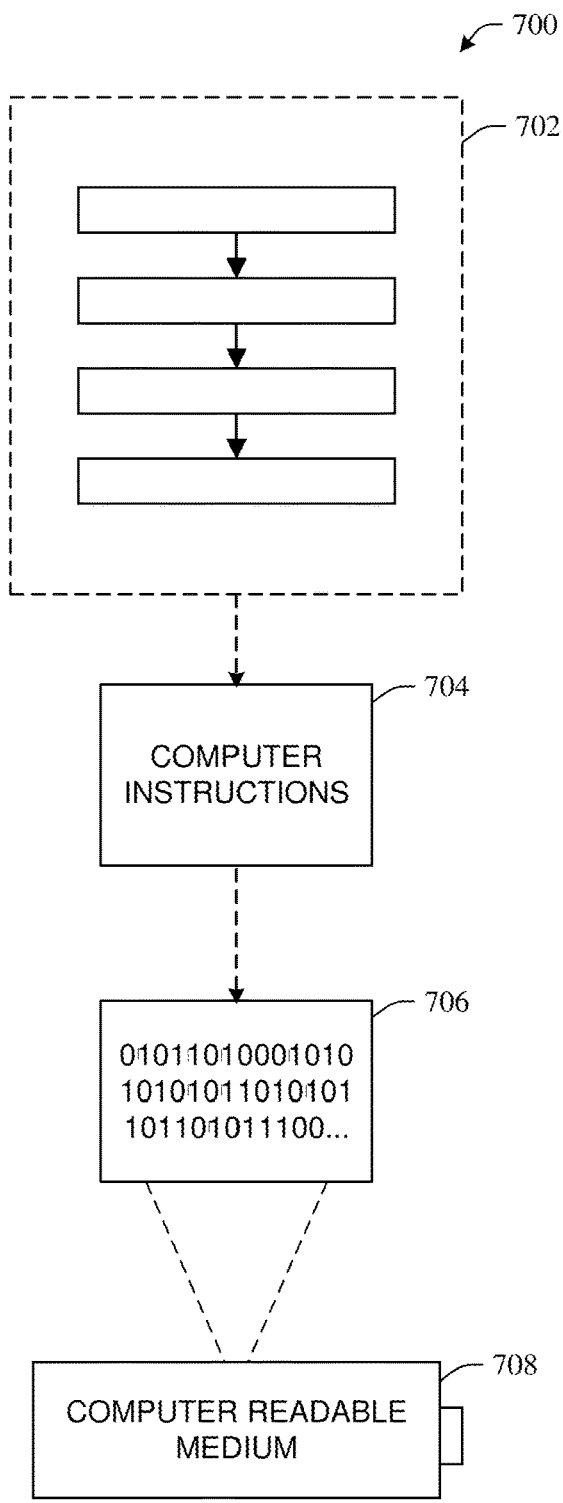
FIG. 7 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 7, wherein an implementation 700 comprises a computer-readable medium 708, such as a CD-R, DVD-R, flash drive, a platter of a hard disk drive, etc., on which is encoded computer-readable data 706. This computer-readable data 706, such as binary data comprising a plurality of zero's and one's as shown in 706, in turn comprises a set of computer instructions 704 configured to operate according to one or more of the principles set forth herein. In one such embodiment 700, the processor-executable computer instructions 704 is configured to perform a method 702, such as at least a portion of one or more of the methods described in connection with embodiments disclosed herein. In another embodiment, the processor-executable instructions 704 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 8:
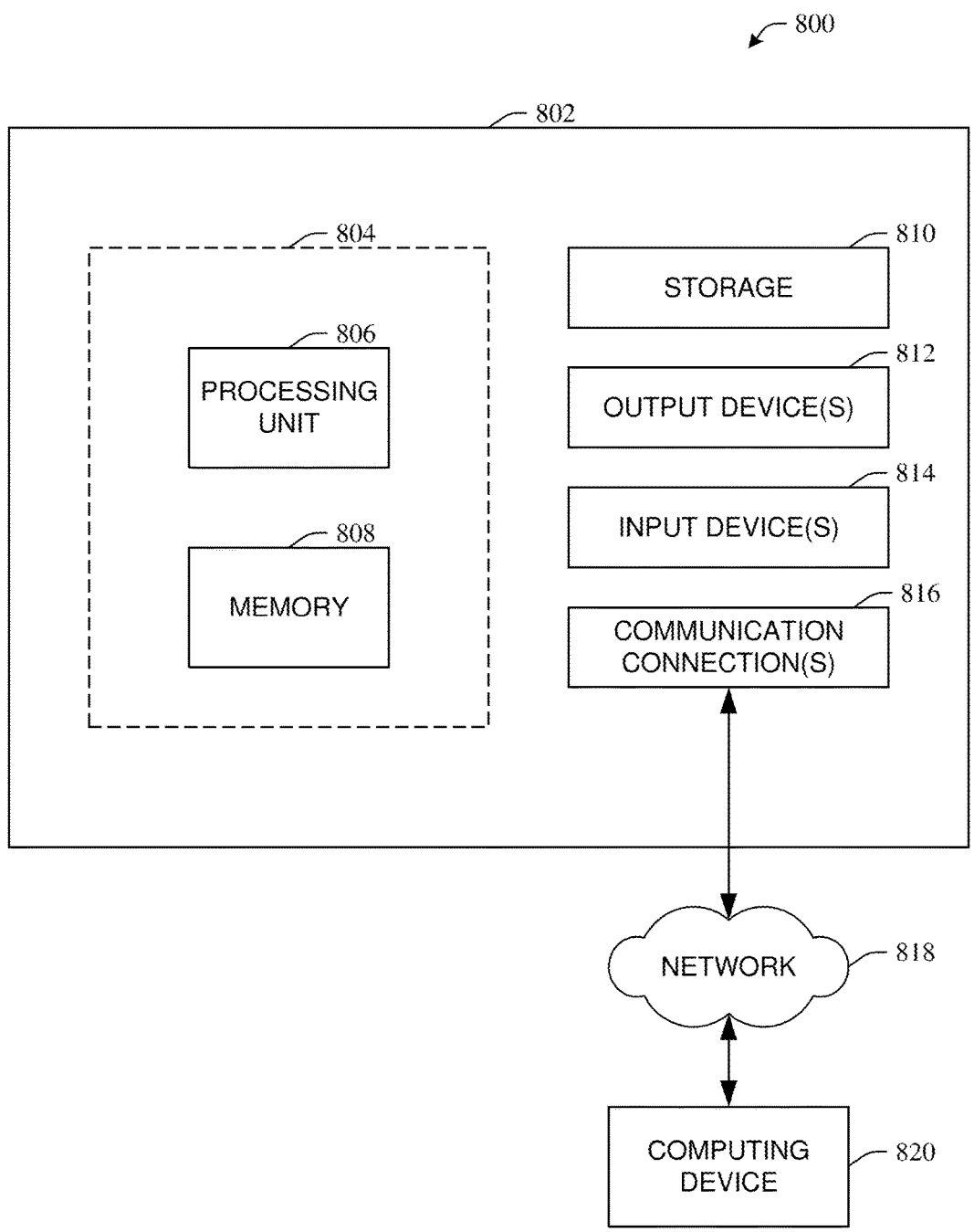
FIG. 8 illustrates a computing environment where one or more of the provisions set forth herein can be implemented, according to some embodiments.

With reference to FIG. 8 and the following discussion provide a description of a suitable computing environment in which embodiments of one or more of the provisions set forth herein can be implemented. The operating environment of FIG. 8 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 8 illustrates a system 800 comprising a computing device 802 configured to implement one or more embodiments provided herein. In one configuration, computing device 802 can include at least one processing unit 806 and memory 808. Depending on the exact configuration and type of computing device, memory 808 may be volatile, such as RAM, non-volatile, such as ROM, flash memory, etc., or some combination of the two. This configuration is illustrated in FIG. 8 by dashed line 804.

In these or other embodiments, device 802 can include additional features or functionality. For example, device 802 can also include additional storage such as removable storage or non-removable storage, including, but not limited to, magnetic storage, optical storage, and the like. Such additional storage is illustrated in FIG. 8 by storage 810. In some embodiments, computer readable instructions to implement one or more embodiments provided herein are in storage 810. Storage 810 can also store other computer readable instructions to implement an operating system, an application program, and the like. Computer readable instructions can be accessed in memory 808 for execution by processing unit 806, for example.

One or more applications and/or program data may be accessible by the computing device 802. According to some implementations, the application(s) and/or program data are included, at least in part, in the computing device 802. The application(s) may include loss risk identification algorithms and/or matching algorithms that is arranged to perform the functions as described herein including those described with respect to the components and/or system described in FIGS. 1-4. The programs data may include loss risk commands and information that may be useful for operation with loss risk identification that provide the matching as described herein.

The term "computer readable media" as used herein includes computer storage media. Computer storage media includes volatile and nonvolatile, removable and non-removable media implemented in any method or technology for storage of information such as computer readable instructions or other data. Memory 808 and storage 810 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 802. Any such computer storage media can be part of device 802.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 802 can include one or more input devices 814 such as keyboard, mouse, pen, voice input device, touch input device, infrared cameras, video input devices, or any other input device. One or more output devices 812 such as one or more displays, speakers, printers, or any other output device can also be included in device 802. The one or more input devices 814 and/or one or more output devices 812 can be connected to device 802 via a wired connection, wireless connection, or any combination thereof. In some embodiments, one or more input devices or output devices from another computing device can be used as input device(s) 814 or output device(s) 812 for computing device 802. Device 802 can also include one or more communication connections 816 that can facilitate communications with one or more other devices 820 by means of a communications network 818, which can be wired, wireless, or any combination thereof, and can include ad hoc networks, intranets, the Internet, or substantially any other communications network that can allow device 802 to communicate with at least one other computing device 820.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for determining loss risks, comprising:
employing a processor to execute executable instructions stored within a memory to perform the following:
receiving client data including client activity data associated with a set of client accounts;
filtering the client activity data into a subset of the client activity data associated with a subset of client accounts, wherein the filtering includes coarse filtering of client data and refined filtering of client activity data to generate the subset of client accounts;
calculating composite activity scores of the subset of client accounts according to the filtered subset of the client activity data;
generating a composite activity ranking from calculated composite activity scores of the subset of client accounts, wherein the composite activity ranking indicates a level of risk of loss;
identifying an activity rank target profile, wherein the activity rank target profile is based at least in part upon a composite of client accounts in the subset of client accounts that have similar composite activity rankings; and
identifying client accounts in the set of client accounts that are similar to the activity rank target profile.

2. The method of claim 1, wherein the client activity data includes data fields that describe client account actions where at least one data field relates to a propensity for a loss risk.

3. The method of claim 1, wherein the generating the composite activity rank comprises:
receiving weights for at least one data field; and
applying the weights to the subset of client activity data.

4. The method of claim 3, wherein the composite activity rank is based at least in part on the weighted ranks for each data field for a client in relation to the plurality of client accounts.

5. The method of claim 1, further comprising:
generating a heat map based at least in part on the client activity data; and
identifying client accounts that are similar to the activity rank target profile based at least in part on the composite activity rank and the generated heat map.

6. The method of claim 5, wherein generating the heat map comprises:
receiving data points from the data fields;
calculating a data distribution of the data points, wherein the data distribution includes bins, wherein each bin represents an interval;
rendering a heat map based, at least in part, on the data distribution, wherein the heat map includes regions corresponding to the bins;
defining thresholds for different values of a data point density;
assigning each bin a threshold based, at least in part, on the data point density of the bin;
assigning a region a color based, at least in part, on the assigned threshold of the bin corresponding to the region; and
coloring the region with the assigned color.

7. The method of claim 5, further comprises:
plotting a trend graph of the composite activity rank of the identified client accounts;
determining a client is a risk for loss; and
identifying the client as a target high risk client.

8. The method of claim 7, determining the client is a risk for loss includes:
tracking the composite activity score of a client in relation to a predetermined threshold score including the time the score is below the threshold.

9. A system for determining loss risks, comprising:
a processor that executes computer executable components stored in a memory;
a client database comprising account information for a set of clients;
a client activity database comprising a set of client activity data for entries in the client database;
a filtering component that filters the client activity data into a subset of client activity data associated with a subset of client accounts, wherein the filtering includes coarse filtering of client data and refined filtering of client activity data to generate the subset of client accounts;
a ranking component that generates a composite activity ranking of the subset of client accounts according to the filtered subset of the client activity data wherein the composite activity ranking of the subset of client accounts identifies at least one loss risk;
a target component that identifies an activity rank target profile, the activity rank target profile is based on a composite of client accounts in the subset of client accounts that have similar composite activity rankings; and
a mapping component that identifies client accounts from the set of client accounts that are similar to the activity rank target profile.

10. The system of claim 9, wherein the client activity database includes data fields describing client account actions where at least one data field relates to a propensity for a loss risk.

11. The system of claim 10, comprising:
a weighting component that applies weights for at least one data field, wherein the filtering component uses the weights to filter the client activity data.

12. The system of claim 11, wherein the composite activating rank is based at least in part on the weighted ranks for each data field for a client in relation to the plurality of client accounts.

13. The system of claim 9, comprising:
a heat mapping component that generates a heat map based at least in part on the client activity data; and
the mapping component that identifies client accounts that are similar to the activity rank target profile based at least in part on the composite activity rank and the generated heat map.

14. The system of claim 13, wherein the heat mapping component, comprises:
- a data distribution logic configured to calculate a data distribution of the data points, wherein the data distribution has bins, wherein each bin corresponds to an interval; and
- a render logic configured to render a heat map based, at least in part, on the data distribution.

15. The system of claim 13, further comprising:
a trend graphing component that plots a trend graph of the composite activity rank of an identified client account to determine a client is a risk for loss.

16. The system of claim 15, wherein the trend graphing component tracks the composite activity score of a client in relation to a predetermined threshold score including the time the score is above the threshold to make a loss risk determination.

17. A non-transitory computer readable medium having instructions to control one or more processors configured to:
receive client data including client activity data associated with a set of client accounts;
filter the client activity data into a subset of the client activity data associated with a subset of client accounts, wherein the filtering includes coarse filtering of client data and refined filtering of client activity data to generate the subset of client accounts;
receive weights for at least one data field; and
apply the weights to the subset of client activity data;
generate a composite activity ranking from calculated composite activity scores of clients according to the filtered subset of the client activity data, wherein the composite activity ranking of clients identifies at least one loss risk;
identify an activity rank target profile, the activity rank target profile is based on a composite of client accounts identified as a loss risk in the subset of client accounts that have similar composite activity rankings; and
identify client accounts from the set of client accounts that are similar to the activity rank target profile.

* * * * *